(12) United States Patent
Jiang et al.

(10) Patent No.: US 8,292,436 B2
(45) Date of Patent: Oct. 23, 2012

(54) PROJECTION SCREEN AND IMAGE PROJECTION SYSTEM USING THE SAME

(75) Inventors: Kai-Li Jiang, Beijing (CN); Liang Liu, Beijing (CN); Chen Feng, Beijing (CN); Li Qian, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 311 days.

(21) Appl. No.: 12/657,562

(22) Filed: Jan. 21, 2010

(65) Prior Publication Data
US 2011/0001933 A1 Jan. 6, 2011

(30) Foreign Application Priority Data
Jul. 3, 2009 (CN) .......................... 2009 1 0108703

(51) Int. Cl.
*G03B 31/00* (2006.01)
*G03B 21/56* (2006.01)
*H04R 25/00* (2006.01)
*G10K 15/04* (2006.01)
*G10K 11/00* (2006.01)

(52) U.S. Cl. .......... 353/15; 359/445; 381/164; 181/142; 181/175

(58) Field of Classification Search .................... 353/15; 359/443, 445; 428/113; 381/164; 313/293; 181/142, 175; 349/128, 23
See application file for complete search history.

(56) References Cited

U.S. PATENT DOCUMENTS

| 1,528,774 | A | 3/1925 | Kranz |
| 4,002,897 | A | 1/1977 | Kleinman et al. |
| 4,334,321 | A | 6/1982 | Edelman |
| 4,503,564 | A | 3/1985 | Edelman et al. |
| 4,641,377 | A | 2/1987 | Rush et al. |
| 4,689,827 | A | 8/1987 | Gurney, Jr. |
| 4,766,607 | A | 8/1988 | Feldman |
| 5,694,477 | A | 12/1997 | Kole |
| 6,473,625 | B1 | 10/2002 | Williams et al. |
| 6,777,637 | B2 | 8/2004 | Nakayama et al. |
| 6,803,116 | B2 | 10/2004 | Ikeda |
| 6,808,746 | B1 | 10/2004 | Dai et al. |
| 6,921,575 | B2 | 7/2005 | Horiuchi et al. |
| 7,045,108 | B2 | 5/2006 | Jiang et al. |
| 7,130,436 | B1 | 10/2006 | Tabata et al. |
| 7,393,428 | B2 | 7/2008 | Huang et al. |
| 7,474,590 | B2 | 1/2009 | Watabe et al. |
| 7,723,684 | B1 | 5/2010 | Haddon et al. |

(Continued)

FOREIGN PATENT DOCUMENTS
CN            2302622        12/1998
(Continued)

OTHER PUBLICATIONS

Silvanus P. Thompson, The Photophone, Nature, Sep. 23, 1880, vol. XXII, No. 569, pp. 481.

(Continued)

*Primary Examiner* — Georgia Y Epps
*Assistant Examiner* — Magda Cruz
(74) *Attorney, Agent, or Firm* — Altis Law Group, Inc.

(57) ABSTRACT

An acoustic projection screen includes a screen base and a carbon nanotube layer. The carbon nanotube layer is attached to the screen base and connected to electrodes.

19 Claims, 8 Drawing Sheets

U.S. PATENT DOCUMENTS

| | | |
|---|---|---|
| 7,799,163 B1 | 9/2010 | Mau et al. |
| 2001/0005272 A1 | 6/2001 | Buchholz |
| 2001/0048256 A1 | 12/2001 | Miyazaki et al. |
| 2002/0076070 A1 | 6/2002 | Yoshikawa et al. |
| 2003/0038925 A1 | 2/2003 | Choi |
| 2003/0165249 A1 | 9/2003 | Higuchi |
| 2004/0053780 A1 | 3/2004 | Jiang et al. |
| 2005/0006801 A1 | 1/2005 | Kinloch et al. |
| 2005/0040371 A1 | 2/2005 | Watanabe et al. |
| 2005/0201575 A1 | 9/2005 | Koshida et al. |
| 2006/0072770 A1 | 4/2006 | Miyazaki |
| 2006/0104451 A1 | 5/2006 | Browning et al. |
| 2006/0147081 A1 | 7/2006 | Mango, III et al. |
| 2006/0250579 A1* | 11/2006 | Silverstein et al. ............. 353/20 |
| 2006/0264717 A1 | 11/2006 | Pesach et al. |
| 2007/0145335 A1 | 6/2007 | Anazawa |
| 2007/0164632 A1 | 7/2007 | Adachi et al. |
| 2007/0166223 A1 | 7/2007 | Jiang et al. |
| 2007/0176498 A1 | 8/2007 | Sugiura et al. |
| 2008/0063860 A1 | 3/2008 | Song et al. |
| 2008/0095694 A1 | 4/2008 | Nakayama et al. |
| 2008/0170982 A1 | 7/2008 | Zhang et al. |
| 2008/0248235 A1 | 10/2008 | Feng et al. |
| 2008/0260188 A1 | 10/2008 | Kim |
| 2008/0299031 A1 | 12/2008 | Liu et al. |
| 2009/0016951 A1 | 1/2009 | Kawabata et al. |
| 2009/0028002 A1 | 1/2009 | Sugiura et al. |
| 2009/0045005 A1 | 2/2009 | Byon et al. |
| 2009/0073363 A1* | 3/2009 | Fu et al. ........................ 349/128 |
| 2009/0085461 A1 | 4/2009 | Feng et al. |
| 2009/0096346 A1 | 4/2009 | Liu et al. |
| 2009/0096348 A1 | 4/2009 | Liu et al. |
| 2009/0145686 A1 | 6/2009 | Watabe et al. |
| 2009/0153012 A1 | 6/2009 | Liu et al. |
| 2009/0167136 A1 | 7/2009 | Liu et al. |
| 2009/0167137 A1 | 7/2009 | Liu et al. |
| 2009/0196981 A1 | 8/2009 | Liu et al. |
| 2009/0232336 A1 | 9/2009 | Pahl |
| 2010/0001976 A1* | 1/2010 | Jiang et al. .................... 345/174 |
| 2010/0054502 A1 | 3/2010 | Miyachi |
| 2010/0054507 A1 | 3/2010 | Oh et al. |
| 2010/0086166 A1 | 4/2010 | Jiang et al. |
| 2010/0093117 A1* | 4/2010 | Jiang et al. ...................... 438/25 |
| 2010/0166232 A1* | 7/2010 | Liu et al. ...................... 381/164 |
| 2010/0233472 A1 | 9/2010 | Liu et al. |
| 2011/0171419 A1 | 7/2011 | Li et al. |

FOREIGN PATENT DOCUMENTS

| | | |
|---|---|---|
| CN | 2327142 | 6/1999 |
| CN | 2425468 | 3/2001 |
| CN | 1407392 | 4/2003 |
| CN | 1443021 | 9/2003 |
| CN | 1698400 | 11/2005 |
| CN | 2779422 Y | 5/2006 |
| CN | 1787696 | 6/2006 |
| CN | 2787870 | 6/2006 |
| CN | 2798479 | 7/2006 |
| CN | 1821048 | 8/2006 |
| CN | 1886820 | 12/2006 |
| CN | 1944829 | 4/2007 |
| CN | 1982209 | 6/2007 |
| CN | 1997243 | 7/2007 |
| CN | 101239712 | 8/2008 |
| CN | 101284662 | 10/2008 |
| CN | 201150134 | 11/2008 |
| CN | 101314464 | 12/2008 |
| CN | 101471213 | 7/2009 |
| CN | 101715155 | 5/2010 |
| CN | 101400198 | 9/2010 |
| JP | 49-24593 | 3/1974 |
| JP | 58-9822 | 1/1983 |
| JP | 60-22900 | 2/1985 |
| JP | 1-255398 | 10/1989 |
| JP | 3-147497 | 6/1991 |
| JP | 4-126489 | 4/1992 |
| JP | 6-33390 | 4/1994 |
| JP | 7-282961 | 10/1995 |
| JP | 9-105788 | 4/1997 |
| JP | 11-282473 | 10/1999 |
| JP | 11-300274 | 11/1999 |
| JP | 2001333493 | 11/2001 |
| JP | 2002-186097 | 6/2002 |
| JP | 2002-352940 | 12/2002 |
| JP | 2002346996 | 12/2002 |
| JP | 2002542136 | 12/2002 |
| JP | 2003500325 | 1/2003 |
| JP | 2003-154312 | 5/2003 |
| JP | 2003198281 | 7/2003 |
| JP | 2003-266399 | 9/2003 |
| JP | 2003-319490 | 11/2003 |
| JP | 2003-319491 | 11/2003 |
| JP | 2003-332266 | 11/2003 |
| JP | 20042103 | 1/2004 |
| JP | 2004-107196 | 4/2004 |
| JP | 2004229250 | 8/2004 |
| JP | 2005-20315 | 1/2005 |
| JP | 2005-51284 | 2/2005 |
| JP | 2005-73197 | 3/2005 |
| JP | 2005-97046 | 4/2005 |
| JP | 2005189322 | 7/2005 |
| JP | 2005-235672 | 9/2005 |
| JP | 2005-318040 | 11/2005 |
| JP | 2005-534515 | 11/2005 |
| JP | 2005-341554 | 12/2005 |
| JP | 2005333601 | 12/2005 |
| JP | 2006-93932 | 4/2006 |
| JP | 2006-180082 | 7/2006 |
| JP | 2006-202770 | 8/2006 |
| JP | 2006-217059 | 8/2006 |
| JP | 2006270041 | 10/2006 |
| JP | 2007-24688 | 2/2007 |
| JP | 2007-54831 | 3/2007 |
| JP | 2007-167118 | 7/2007 |
| JP | 2007-174220 | 7/2007 |
| JP | 2007-187976 | 7/2007 |
| JP | 2007-196195 | 8/2007 |
| JP | 2007-228299 | 9/2007 |
| JP | 2007-527099 | 9/2007 |
| JP | 2008-62644 | 3/2008 |
| JP | 2008-101910 | 5/2008 |
| JP | 2008-163535 | 7/2008 |
| JP | 2008-269914 | 11/2008 |
| JP | 2009-31031 | 2/2009 |
| JP | 2009-91239 | 4/2009 |
| JP | 2009-94074 | 4/2009 |
| JP | 2009-146896 | 7/2009 |
| JP | 2009-146898 | 7/2009 |
| JP | 2009-164125 | 7/2009 |
| JP | 2009-184907 | 8/2009 |
| JP | 2009-184908 | 8/2009 |
| KR | 10-0761548 | 9/2007 |
| TW | 200740976 | 11/2007 |
| TW | 200744399 | 12/2007 |
| TW | 201029481 | 8/2010 |
| WO | WO0073204 | 12/2000 |
| WO | WO2004012932 | 2/2004 |
| WO | WO2005102924 | 11/2005 |
| WO | WO2005120130 | 12/2005 |
| WO | WO2007043837 | 4/2007 |
| WO | WO2007049496 | 5/2007 |
| WO | WO2007052928 | 5/2007 |
| WO | WO2007099975 | 9/2007 |
| WO | WO2007111107 | 10/2007 |
| WO | WO2008/029451 | 3/2008 |

OTHER PUBLICATIONS

Lee et al., Photosensitization of nonlinear scattering and photoacoustic emission from single-walled carbon nanotubes, Applied Physics Letters, Mar. 13, 2008, 92, 103122.

Alexander Graham Bell, Selenium and the Photophone, Nature, Sep. 23, 1880, pp. 500-503.

Kaili Jiang, Qunqing Li, Shoushan Fan, Spinning continuous carbon nanotube yarns, Nature, Oct. 24, 2002, pp. 801, vol. 419.

Kai Liu, Yinghui Sun, Lei Chen, Chen Feng, Xiaofeng Feng, Kaili Jiang et al., Controlled Growth of Super-Aligned Carbon Nanotube Arrays for Spinning Continuous Unidirectional Sheets with Tunable Physical Properties, Nano Letters, 2008, pp. 700-705, vol. 8, No. 2.

Yang Wei, Kaili Jiang, Xiaofeng Feng, Peng Liu et al., Comparative studies of multiwalled carbon nanotube sheets before and after shrinking, Physical Review B, Jul. 25, 2007, vol. 76, 045423.

Lina Zhang, Chen Feng, Zhuo Chen, Liang Liu et al., Superaligned Carbon Nanotube Grid for High Resolution Transmission Electron Microscopy of Nanomaterials, Nano Letters, 2008, pp. 2564-2569, vol. 8, No. 8.

Strutt John William, Rayleigh Baron, The Theory of Sound, 1926, pp. 226-235, vol. 2.

Swift Gregory W., Thermoacoustic Engines and Refrigerators, Physics Today, Jul. 1995, pp. 22-28, vol. 48.

Braun Ferdinand, Notiz uber Thermophonie, Ann. Der Physik, Apr. 1898, pp. 358-360, vol. 65.

Lin Xiao, Zhuo Chen, Chen Feng, Liang Liu et al., Flexible, Stretchable, Transparent Carbon Nanotube Thin Film Loudspeakers, Nano Letters, 2008, pp. 4539-4545, vol. 8, No. 12, US.

H.D. Arnold, I.B. Crandall, The Thermophone as a Precision Source of Sound, Physical Review, 1917, pp. 22-38, vol. 10.

W. Yi, L.Lu, Zhang Dianlin et al., Linear Specific Heat of Carbon Nanotubes, Physical Review B, Apr. 1, 1999, vol. 59, No. 14, R9015-9018.

Zhuangchun Wu, Zhihong Chen, Xu Du et al., Transparent, Conductive Carbon Nanotube Films, Science, Aug. 27, 2004, pp. 1273-1276, vol. 305.

P. De Lange, On Thermophones, Proceedings of the Royal Society of London. Series A, Apr. 1, 1915, pp. 239-241, vol. 91, No. 628.

William Henry Preece, On Some Thermal Effects of Electric Currents, Proceedings of the Royal Society of London, 1879-1880, pp. 408-411, vol. 30.

J.J.Hopfield: Spectra of Hydrogen, Nitrogen and Oxygen in the Extreme Ultraviolet, Physical Review, 1922, pp. 573-588, vol. 20.

Edward C. Wente, The Thermophone, Physical Review, 1922, pp. 333-345, vol. 19.

Frank P. Incropera, David P. Dewitt et al., Fundamentals of Heat and Mass Transfer, 6th ed., 2007, pp. A-5, Wiley:Asia.

Xiaobo Zhang, Kaili Jiang, Chen Feng, Peng Liu et al., Spinning and Processing Continuous Yarns from 4-Inch Wafer Scale Super-Aligned Carbon Nanotube Arrays, Advanced Materials, 2006, pp. 1505-1510, vol. 18.

http://www.physorg.com/news123167268.html.

Mei Zhang, Shaoli Fang, Anvar A. Zakhidov, Sergey B. Lee et al., Strong, Transparent, Multifunctional, Carbon Nanotube Sheets, Science, Aug. 19, 2005, pp. 1215-1219, vol. 309.

Chen, Huxiong; Diebold, Gerald, "Chemical Generation of Acoustic Waves: A Giant Photoacoustic Effect", Nov. 10, 1995, Science, vol. 270, pp. 963-966.

Amos, S.W.; "Principles of Transistor Circuits"; 2000; Newnes-Butterworth-Heinemann; 9th ed.; p. 114.

Lin Xiao et al., "Flexible, stretchable, transparent carbon nanotube thin film loudspeakers" vol. 8, No. 12, pp. 4539-4545, 2008.

P.M. Ajayan et al., "Nanotubes in a flash-Ignition and reconstruction", Science, vol. 296, pp. 705, Apr. 26, 2002.

F.Kontomichos et al., "A thermoacoustic device for sound reproduction", acoustics 08 Paris, pp. 4349-4353, Jun. 29-Jul. 4, 2008.

F. Kontomichos et al ., "A thermoacoustic device for sound reproduction", acoustics 08' Paris, Jun. 29-Jul. 4, 2008.

* cited by examiner

PROJECTION SCREEN AND IMAGE PROJECTION SYSTEM USING THE SAME

CROSS-REFERENCE TO RELATED APPLICATIONS

This application claims all benefits accruing under 35 U.S.C. §119 from China Patent Application No. 200910108703.5, filed on Jul. 3, 2009, in the China Intellectual Property Office.

BACKGROUND

1. Technical Field

The present disclosure relates to reflecting image projection screens and image projection systems using the same and, particularly, to a projection screen capable of playing sound and an image projection system using the same.

2. Description of Related Art

An image projection system includes a reflective projection screen and an image projector. The reflective projection screen has a light diffusing surface that faces to the audience. An image light emitted from the image projector is projected to the screen and is diffused by the light diffusing surface to the audience's eyes. The image projection system can also include a loudspeaker to produce sounds. The loudspeaker can be disposed behind the screen to mimic a sound emitting screen that make the audience have an impression that the screen itself can produce sound.

However, the screen of the image projection system does not really produce sound. The conventional electric-dynamic loudspeaker adopts a weighty magnet to create a mechanical movement of a diaphragm that takes a large place. Therefore, that additional loudspeaker incorporated into the image projection system increases the weight and volume. The conventional image projection system adopts two separate apparatus, screen and loudspeaker, to accomplish the functions of diffusing light and emitting sounds. Further, the mounting and arrangement of the loudspeaker is complex especially in the situation that the image projection system is needed to be transferred from one place to another.

What is needed, therefore, is to provide a projection screen capable of emitting sound and an image projection system using the same.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
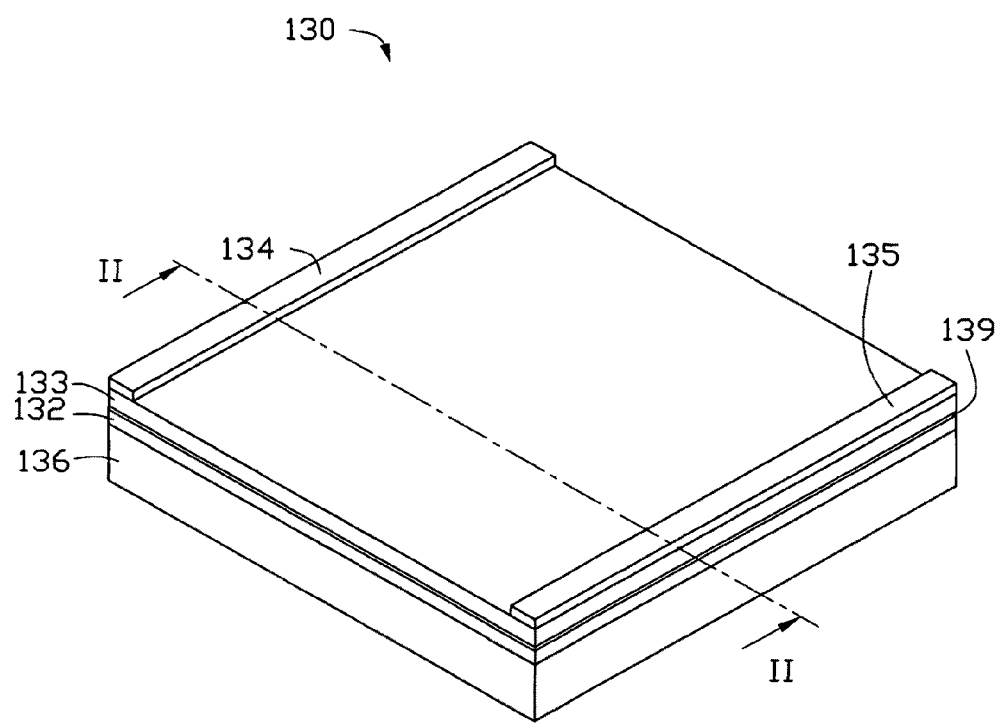
FIG. 1 is a schematic structural view of an embodiment of an acoustic projection screen.
Figure 2:
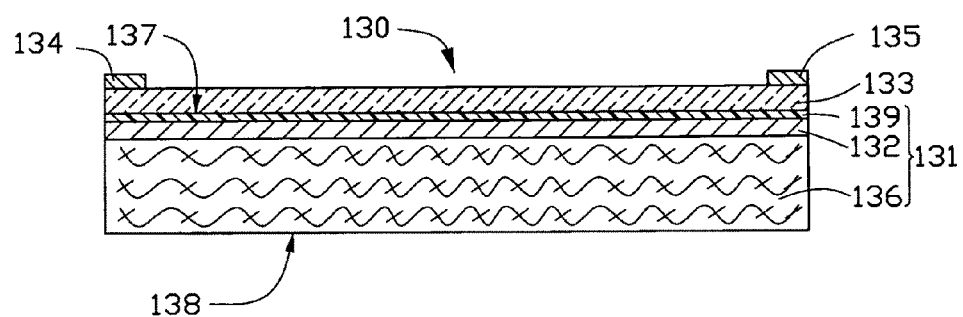
FIG. 2 is a cross-sectional view of the screen along a line II-II of FIG. 1.

Referring to FIG. 1 and FIG. 2, an acoustic projection screen 130 is to reflect an image light beam projected thereon from a projector 110 and to synchronizely emit audible sounds by receiving electrical signals from an audio electrical signal device.

The acoustic projection screen 130 includes a screen base 131, a carbon nanotube layer 133, a first electrode 134 and a second electrode 135. The carbon nanotube layer 133 is located on the screen base 131. The first electrode 134 and second electrode 135 are electrically connected with the carbon nanotube layer 133.

The screen base 131 has a first surface 137 and a second surface 138 opposite to the first surface 137. The first surface 137 is the viewing surface. The second surface 138 is the non-viewing surface. The carbon nanotube layer 133 can be located on either or both of the first and second surfaces 137, 138 and be exposed to surrounding air. The screen base 131 can be any conventional screen used in the conventional image projection system. More specifically, the screen base 131 can include a base 136 and a light diffusing layer 139 located on the base 136 to diffuse light transmitted therethrough. The screen base 131 can be a rear projection screen or a reflective projection screen. In the embodiment shown in FIG. 1 and FIG. 2, the screen base 131 is a reflective projection screen, and the base 136 is made of a white, opaque, flexible material such as polyvinyl chloride, polypropylene, or polyethylene. The base 136 can also be a fabric or a white wall. The light diffusing layer 139 can be made by printing a light diffusing material on the base 136.

Figure 5:
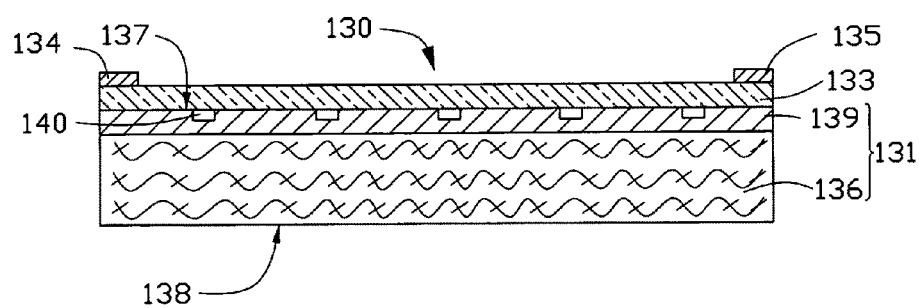
FIG. 5 is a schematic connection view of another embodiment of the acoustic projection screen.

As shown in FIG. 5, the carbon nanotube layer 133 can be located on the second surfaces 138. In this embodiment, the screen base 131 defines a plurality of micropores that allows sounds produced by the carbon nanotube layer 133 to be transmitted from the screen base 131 to the audience.

The screen base 131 can further include a reflective layer 132 facing to the incident light beam. The reflective layer 132 is located between the base 136 and the light diffusing layer 139. The light diffusing layer 139 can cover the reflective layer 132. The reflective layer 132 can increase the reflectivity of the screen base 131. The reflective layer 132 can be made of ZnO, SiC, glass, or $BaSO_4$. The reflectivity of the reflective layer 132 can be in a range from about 5% to about 70%. The total reflectivity of the acoustic projection screen 130 can be in a range from about 5% to about 50%. When the carbon nanotube layer 133 is disposed on the second surface 138 as shown in FIG. 5, the reflectivity of the reflective layer 132 can be in a range from about 5% to about 50%.

Alternatively, the reflective layer 132 and the light diffusing layer 139 can be omitted. Thus the carbon nanotube layer 133 can be directly attached on at least one the base 136.

The carbon nanotube layer 133 is a sound wave generator working as a thermoacoustic principle. The carbon nanotube layer 133 has a very small heat capacity per unit area. The heat capacity per unit area of the carbon nanotube layer 133 is less than $2\times10^{-4}$ J/cm$^2$*K. The carbon nanotube layer 133 has a small thickness (e.g., ranged from about 0.5 nanometers to about 1 millimeter) and a large specific surface area (e.g., above 30 m$^2$/g) for causing the pressure oscillation in the surrounding medium by the temperature waves generated by the carbon nanotube layer 133. In one embodiment, the thickness of the carbon nanotube layer 133 is smaller than 10 microns. The carbon nanotube layer 133 can be a free-standing structure that is laid on the screen base 131. The term "free-standing" includes, but is not limited to, a structure that does not have to be supported by a substrate and can sustain the weight of it when it is hoisted by a portion thereof without any significant damage to its structural integrity. The suspended part of the carbon nanotube layer 133 will have more sufficient contact with the surrounding air to have heat exchange with the surrounding air from both sides of the carbon nanotube layer 133. The carbon nanotube layer 133 is a thermoacoustic film. The carbon nanotubes in the carbon nanotube layer 133 are combined by van der Waals attractive force therebetween. The larger the specific surface area of the carbon nanotube layer 133, the smaller the heat capacity per unit area will be. The smaller the heat capacity per unit area, the higher the sound pressure level of the sound produced by the carbon nanotube layer 133.

The carbon nanotube layer 133 can include at least one drawn carbon nanotube film formed by drawing a film from a carbon nanotube array that is capable of having a film drawn therefrom. The method for drawing the drawn carbon nanotube film can be referred to US patent publication number 2008/0248235A1. The heat capacity per unit area of the drawn carbon nanotube film can be less than or equal to about $1.7\times10^{-6}$ J/cm$^2$*K. The drawn carbon nanotube film can have a large specific surface area (e.g., above 100 m$^2$/g). In one embodiment, the drawn carbon nanotube film has a specific surface area in the range from about 200 m$^2$/g to about 2600 m$^2$/g. In one embodiment, the drawn carbon nanotube film has a specific weight of about 0.05 g/m$^2$. The thickness of the drawn carbon nanotube film can be in a range from about 0.5 nanometers to about 50 nanometers. Due to the small thickness, the drawn carbon nanotube film is substantially transparent. The transmittance of the single drawn carbon nanotube film with a thickness smaller than 50 nanometers for visible lights can be in a range from about 85% to about 99%.

Figure 3:
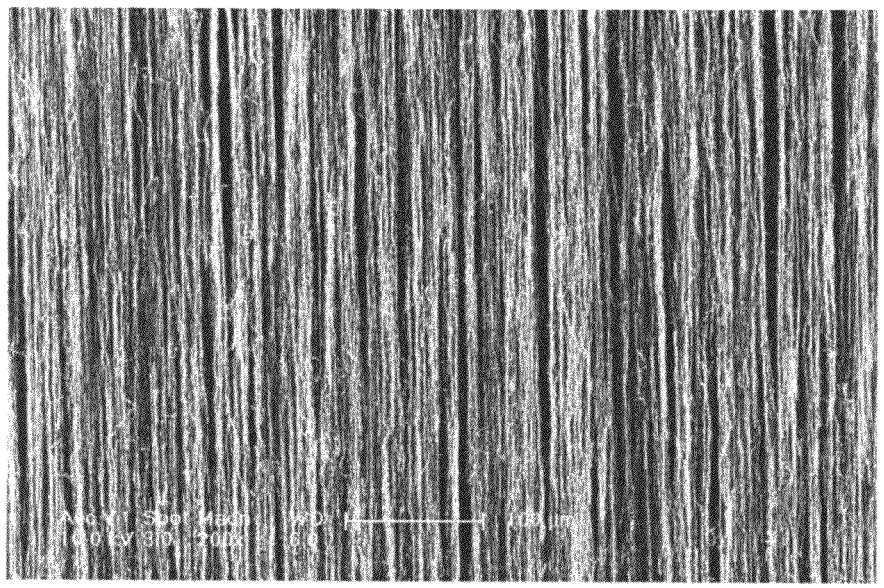
FIG. 3 shows a Scanning Electron Microscope (SEM) image of a drawn carbon nanotube film.

Referring to FIG. 3, the drawn carbon nanotube film includes a plurality of carbon nanotubes that are arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals attractive force. A small number of the carbon nanotubes are randomly arranged in the drawn carbon nanotube film, and has a small if not negligible effect on the larger number of the carbon nanotubes in the drawn carbon nanotube film arranged substantially along the same direction. The drawn carbon nanotube film is capable of forming a free-standing structure. The free-standing structure of the drawn carbon nanotube film is realized by the successive carbon nanotubes joined end to end by van der Waals attractive force.

It can be appreciated that some variation can occur in the orientation of the carbon nanotubes in the drawn carbon nanotube film as can be seen in FIG. 3. Microscopically, the carbon nanotubes oriented substantially along the same direction may not be perfectly aligned in a straight line, and some curve portions may exist. It can be understood that a contact between some carbon nanotubes located substantially side by side and oriented along the same direction can not be totally excluded.

Figure 4:
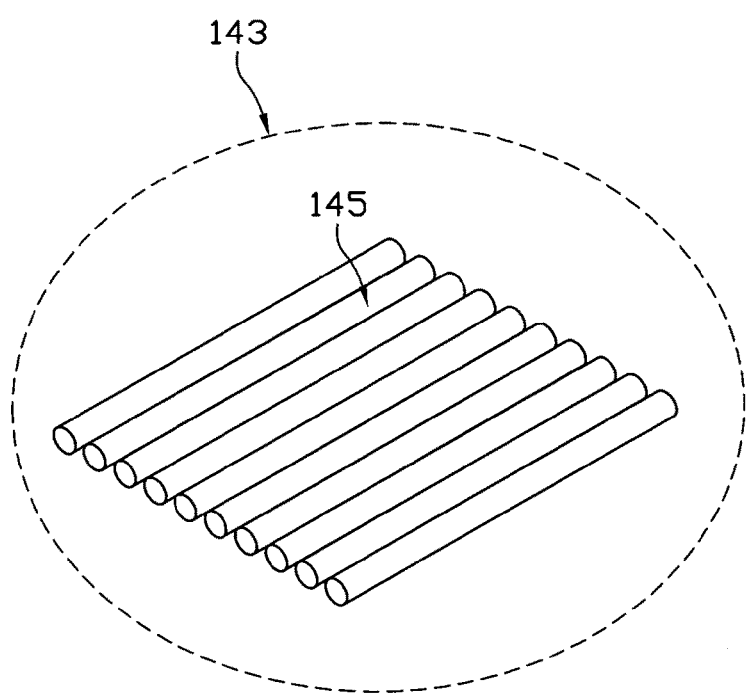
FIG. 4 is a schematic structure view of a carbon nanotube segment of the drawn carbon nanotube film.

More specifically, referring to FIG. 4, the drawn carbon nanotube film includes a plurality of successively oriented carbon nanotube segments 143 joined end-to-end by van der Waals attractive force therebetween. Each carbon nanotube segment 143 includes a plurality of carbon nanotubes 145 substantially parallel to each other, and joined by van der Waals attractive force therebetween. The carbon nanotube segments 143 can vary in width, thickness, uniformity and shape. The carbon nanotubes 145 in the drawn carbon nanotube film 143 are also substantially oriented along a preferred orientation.

The carbon nanotube layer 133 can include more than one carbon nanotube films. The carbon nanotube films in the carbon nanotube layer 133 can be coplanar and/or stacked. Coplanar carbon nanotube films can also be stacked one upon other coplanar films. Adjacent carbon nanotube films can be joined by only the van der Waals attractive force therebetween without the need of an additional adhesive. The number of the layers of the carbon nanotube films is not limited. However, as the stacked number of the carbon nanotube films increases, the specific surface area and the transparency of the carbon nanotube layer 133 will decrease. A large enough specific surface area (e.g., above 30 m$^2$/g) must be maintained to achieve an acceptable acoustic volume. The transmittance of the carbon nanotube layer 133 for visible lights should also be maintained above 70% (e.g., in a range from about 70% to about 99%). An angle between the aligned directions of the carbon nanotubes in the two adjacent drawn carbon nanotube films can range from about 0 degrees to about 90 degrees. In one embodiment, all the drawn carbon nanotube films in the carbon nanotube layer 133 are arranged along the same direction. That is, all the carbon nanotubes in the carbon nanotube layer 133 are aligned substantially along the same direction and substantially parallel to the surface of the carbon nanotube layer 133.

In other embodiments, the carbon nanotube layer 133 can be or include at least one composite carbon nanotube film. A composite drawn carbon nanotube film can be formed by depositing at least a conductive layer on the outer surface of the individual carbon nanotubes of a drawn carbon nanotube film. The carbon nanotubes can be individually coated or partially covered with conductive material. Thereby, the composite drawn carbon nanotube film can inherit the properties of the drawn carbon nanotube film such as the large specific surface area, the high transparency, the small heat capacity per unit area. Further, the conductivity of the composite drawn carbon nanotube film is greater than the pure drawn carbon nanotube film. Thereby, the driven voltage of the acoustic projection screen 130 using the at least one composite drawn carbon nanotube film will be decreased. The conductive material can be placed on the carbon nanotubes by using a method of vacuum evaporation, spattering, chemical vapor deposition (CVD), electroplating, or electroless plating. The material of the conductive material can comprise of iron (Fe), cobalt (Co), nickel (Ni), palladium (Pd), titanium (Ti), copper (Cu), silver (Ag), gold (Au), platinum (Pt), and combinations thereof. The thickness of the layer of conductive material can be ranged from about 1 nanometer to about 20 nanometers.

In one embodiment, the carbon nanotube layer 133 is a composite drawn carbon nanotube film with a Ni layer located on the individual outer surface of each of the carbon nanotubes, and an Au layer located on the Ni layer. The thickness of the Ni layer is about 2 nanometers. The thickness of the Au layer is about 15 nanometers.

The carbon nanotube layer 133 has a small heat capacity per unit area, and a large surface area for causing the pressure oscillation in the surrounding medium by the temperature waves generated by the carbon nanotube layer 133. In use, when electrical signals, with variations in the application of the signals and/or strength applied to the carbon nanotube layer 133, repeated heating is produced by the carbon nanotube layer 133 according to the variations of the signals and/or signal strength. Temperature waves, which are propagated into surrounding medium, are obtained. The temperature waves produce pressure waves in the surrounding medium, resulting in sound generation. In this process, it is the thermal expansion and contraction of the medium in the vicinity of the carbon nanotube layer 133 that produces sound. This is distinct from the mechanism of the conventional loudspeaker, in which the pressure waves are created by the mechanical movement of the diaphragm. There is an "electrical-thermal-sound" conversion when the electrical signals are applied on the carbon nanotube layer 133 through the first and second electrodes 134, 135.

Figure 6:
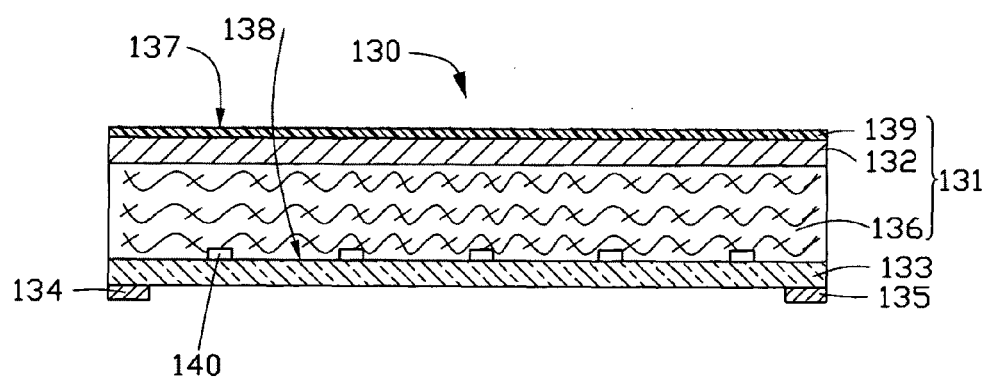
FIG. 6 is a schematic structural view of another embodiment of the acoustic projection screen.

As shown in FIG. 5 and FIG. 6, to increase the contacting area of the carbon nanotube layer 133 with the surrounding air, microstructures 140 can be further disposed or formed on the surface of the screen base 131 that is in contact with the carbon nanotube layer 133. When the carbon nanotube layer 133 is located on the first surface 137 of the screen base 131, the first surface 137 can include a plurality of microstructures 140. When the carbon nanotube layer 133 is located on the second surface 138 of the screen base 131, the second surface 138 can include a plurality of microstructures 140. The microstructures 140 can define a plurality of recesses. The portions of the carbon nanotube layer 133 covered on the recesses are suspended. Accordingly, the contacting area of the carbon nanotube layer 133 can be increased. The recesses can be through holes and/or blind holes.

When the carbon nanotubes in the carbon nanotube layer 133 are substantially aligned along the same direction and parallel to the surface of the carbon nanotube layer 133, the carbon nanotube layer 133 works as a polarizer as well. The carbon nanotube layer 133 transmits light of one polarization state that is perpendicular to the carbon nanotubes therein, and absorbs light of a polarization state that is parallel to the carbon nanotubes therein.

The first electrode 134 and second electrode 135 can be located on the carbon nanotube layer 133 and apart from each other. By electrically contacting with the carbon nanotube layer 133, the first and second electrodes 134, 135 are electrically connected to the carbon nanotube layer 133. The first electrode 134 and the second electrode 135 input electrical signals to the carbon nanotube layer 133 from the audio electrical signal device. The electrical signals are electrically conducted through the carbon nanotube layer 133 from the first electrode 134 to the second electrode 135. In one embodiment, all the carbon nanotubes of the carbon nanotube layer 133 are substantially parallel to a direction from the first electrode 134 to the second electrode 135. The first and second electrodes 134, 135 can be made of metal wires, metal layers, or other conductive layers with relatively high conductivity. In one embodiment, the first and second electrodes 134, 135 are two silver paste layers screen printed on the screen base 131. In other embodiment, the first and second electrodes 134, 135 can be made of transparent conductive material such as conductive polymer, conductive fiber or carbon nanotubes. The width of the first and second electrodes 134, 135 can be in a range from about 1 micron to about 5 millimeters. The length of the first and second electrodes 134, 135 can be equal to the length of the screen base.

The electrical signals input from the first and second electrodes 134, 135 are amplified signals that have the enough voltage to drive the carbon nanotube layer 133 to produce sounds with a sound pressure level that can be heard by the audience. An amplifier can be further connected between the audio electrical signal device and the first and second electrodes 134, 135.

Figure 7:
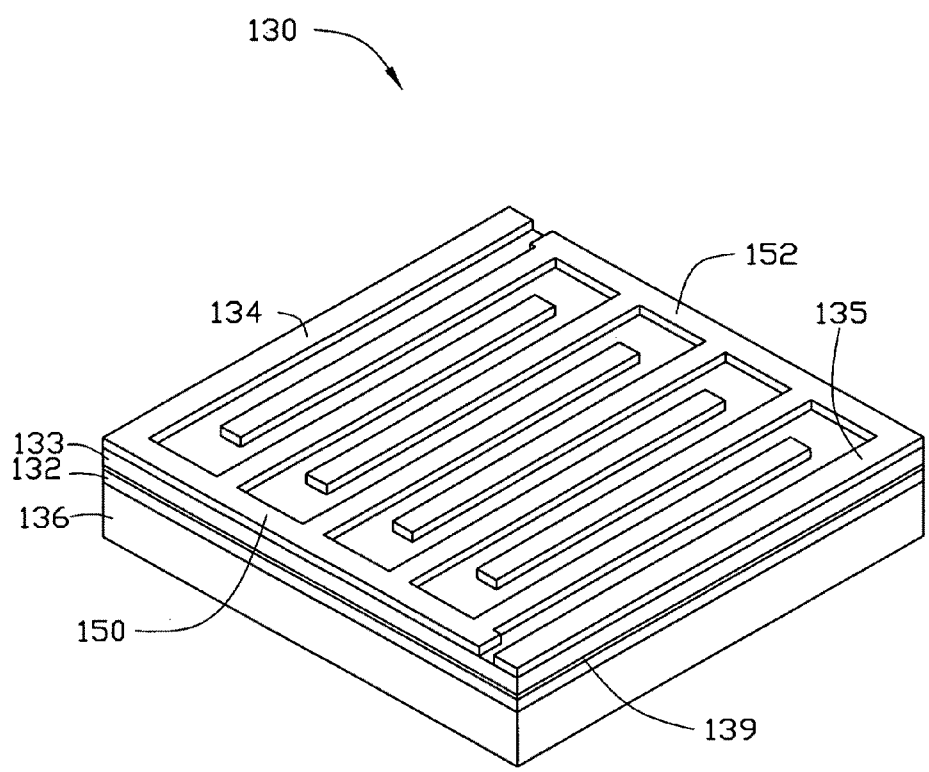
FIG. 7 is a schematic structural view of another embodiment of the acoustic projection screen.

Referring to FIG. 7, in one embodiment, the acoustic projection screen 130 can include a plurality of alternatively arranged first and second electrodes 134, 135. The first electrodes 134 and the second electrodes 135 can be arranged as a staggered manner of "+−+−". All the first electrodes 134 are electrically connected together, and all the second electrodes 135 are electrically connected together. The sections of the carbon nanotube layer 133 between the adjacent first electrode 134 and the second electrode 135 are connected in parallel. An electrical signal is conducted in the carbon nanotube layer 133 from the first electrodes 134 to the second electrodes 135. By placing the sections in parallel, the resistance of the acoustic projection screen 130 is decreased. Therefore, the driving voltage of the acoustic projection screen 130 can be decreased with the same effect.

The first electrodes 134 and the second electrodes 135 can be substantially parallel to each other with a same distance between the adjacent first electrode 134 and the second electrode 135.

To connect all the first electrodes 134 together, and connect all the second electrodes 135 together, first conducting member 150 and second conducting member 152 can be arranged. All the first electrodes 134 are connected to the first conducting member 150. All the second electrodes 135 are connected to the second conducting member 152. The carbon nanotube layer 133 is divided by the first and second electrodes 134, 135 into many sections. The sections of the carbon nanotube layer 133 between the adjacent, first electrode 134 and the second electrode 135 are in parallel. The electrical signals are conducted in the carbon nanotube layer 133 from the first electrodes 134 to the second electrodes 135. The first conducting member 150 and the second conducting member 152 can be made of the same material as the first and second electrodes 134, 135, and can be perpendicular to the first and second electrodes 134, 135.

The acoustic projection screen 130 adopts carbon nanotube layer 133 as the sound wave generator to emit sounds synchronized with the showing of the projected image. Thus, the acoustic projection screen 130 no longer requires the weight electric-dynamic loudspeaker. The carbon nanotube layer 133 is lightweight and does not need require a weighty magnet. Accordingly, the acoustic projection screen 130 has a simplified structure. The carbon nanotube layer 133 is flexible, and thus, the acoustic projection screen 130 can be conveniently rolled up and transferred from one place to another easily.

Figure 8:
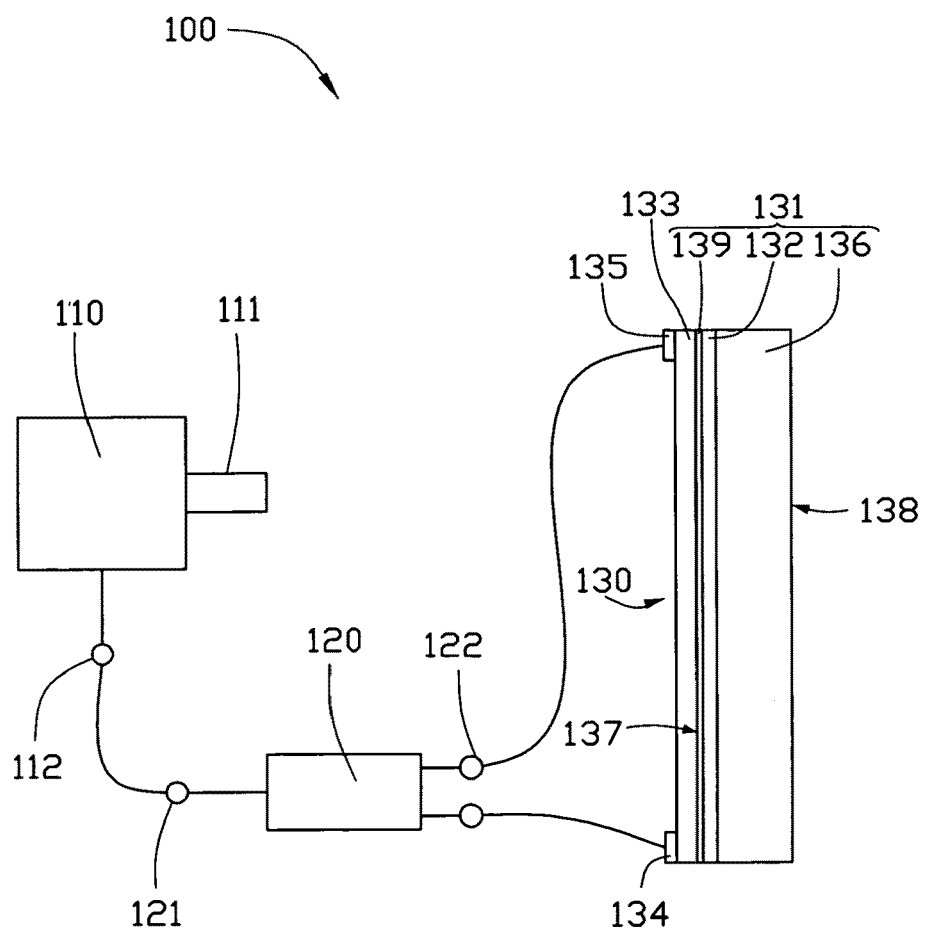
FIG. 8 is a schematic connection view of an embodiment of an image projection system.

Referring to FIG. 8, an image projection system 100 according to an embodiment includes a projector 110, and a projection screen 130. The projector 110 projects an image light beam to the acoustic projection screen 130.

The projector 110 includes an image light beam outlet 111 facing to the first surface 137 of the screen base 131 of the acoustic projection screen 130. The image light beam is transmitted through lenses in the projector 110 and output from the image light beam outlet 111 to project on the acoustic projection screen 130. The projector 110 can further and optionally include an audio electrical signal output end 112 that is capable of outputting audio electrical signals synchronized with the image light beam. The audio electrical signals are input to the carbon nanotube layer 133 through conducting wires connected between first and second electrodes 134, 135 and the audio electrical signal output end 112. It is to be understood that if the projector 110 does not include the audio electrical signal output end 112 and can only output the image light beam, an additional and separate audio electrical signal device can be further adopted to input the audio electrical signals to the carbon nanotube layer 133.

It is to be understood that the audio electrical signals are amplified signals that has enough power to drive the acoustic projection screen 130 to produce audible sounds. That is, an amplifier 120 can be either a part of or separate from the projector 110. In the embodiment shown in FIG. 8, the image projection system 100 further includes the amplifier 120. The amplifier 120 is connected between the audio electrical signal output end 112 of the projector 110 and the first and second electrodes 134, 135 of the projection screen 130, and amplifies audio electrical signals and input the amplified signals to the projection screen 130 thereby driving the projection screen 130 to produce sounds that can be heard by the audience.

The amplifier 120 can includes an input end 121 and two output ends 122. The two output ends 122 are respectively connected to the first and second electrodes 134, 135. The input end 121 is connected to the audio electrical signal output end 112 of the projector 110.

It is to be understood that the above-described embodiments are intended to illustrate rather than limit the invention. Any elements described in accordance with any embodiments is understood that they can be used in addition or substituted in other embodiments. Embodiments can also be used together. Variations may be made to the embodiments without departing from the spirit of the invention. The above-described embodiments illustrate the scope of the invention but do not restrict the scope of the invention.

What is claimed is:

1. An acoustic projection screen comprising:
    a screen base; and
    a carbon nanotube layer attached to the screen base and connected to electrodes;
    wherein the carbon nanotube layer is capable of converting electrical signal into heat and causing an audible thermoacoustic effect.

2. The acoustic projection screen of claim 1, wherein the carbon nanotube layer is a free-standing structure.

3. The acoustic projection screen of claim 2, wherein the carbon nanotube layer comprises at least one carbon nanotube film drawn from a carbon nanotube array.

4. The acoustic projection screen of claim 3, wherein the carbon nanotube film comprises a plurality of carbon nanotubes joined end-to-end by Van der Waals attractive force.

5. The acoustic projection screen of claim 1, wherein the electrodes comprise a first electrode and a second electrode located on the carbon nanotube layer, the carbon nanotube layer comprises a plurality of carbon nanotubes aligned along a direction from the first electrode to the second electrode.

6. The acoustic projection screen of claim 1, wherein a transmittance of the carbon nanotube layer for visible light is in a range from about 70% to about 99%.

7. The acoustic projection screen of claim 1, wherein a transmittance of the carbon nanotube layer for visible light is in a range from about 85% to about 99%.

8. The acoustic projection screen of claim 1, wherein the carbon nanotube layer comprises at least one free-standing composite carbon nanotube film, the composite carbon nanotube film comprises a plurality of carbon nanotubes individually coated with a metal layer.

9. The acoustic projection screen of claim 8, wherein the metal layer has a thickness that is in a range from about 1 nanometer to about 20 nanometers.

10. The acoustic projection screen of claim 1, wherein the screen base defines a plurality of micropores, and the carbon nanotube layer is located on the screen base.

11. The acoustic projection screen of claim 1, wherein the screen base comprises a base and a light diffusing layer located on the base.

12. The acoustic projection screen of claim 11 further comprising a reflective layer located between the light diffusing layer and the base.

13. The acoustic projection screen of claim 1, wherein the electrodes comprise a plurality of first electrodes and a plurality of second electrodes located on the carbon nanotube layer in a staggered manner.

14. The acoustic projection screen of claim 13 further comprising a first conducting member connected to all the first electrodes and a second conducting member connected to all the second electrodes.

15. An image projection system comprising:
    an acoustic projection screen comprising:
        a screen base; and
        a carbon nanotube layer attached to the screen base and connected to electrodes; and
    a projector capable of projecting an image to the acoustic projection screen;
    wherein the carbon nanotube layer is capable of converting electrical signal into heat and causing an audible thermoacoustic effect.

16. The image projection system of claim 15, further comprising an amplifier connected between the projector and the acoustic projection screen, and the amplifier is capable of amplifying audio electrical signals output from the projector to drive the carbon nanotube layer of the acoustic projection screen to produce sounds.

17. The image projection system of claim 15, further comprising an audio electrical signal device that is capable of inputting audio electrical signals to the carbon nanotube layer of the acoustic projection screen.

18. The image projection system of claim 15, wherein the screen base comprises a viewing surface, and the carbon nanotube layer is located on the viewing surface.

19. The image projection system of claim 15, wherein the screen base comprises a non-viewing surface and the carbon nanotube layer is located on the non-viewing surface.

* * * * *